Figure 1:
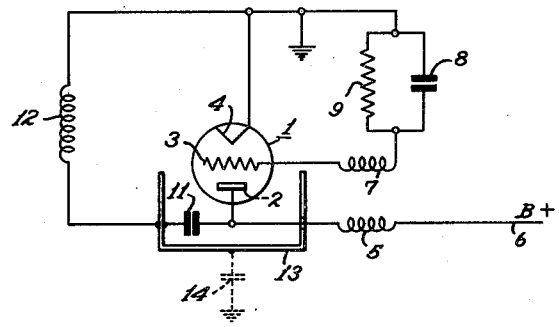

March 20, 1951  R. M. BAKER  2,545,985
HIGH-FREQUENCY OSCILLATOR
Filed Sept. 19, 1947

WITNESSES:
Edward Michaels

INVENTOR
Robert M. Baker.
BY F. W. Lyle
ATTORNEY

Patented Mar. 20, 1951

2,545,985

UNITED STATES PATENT OFFICE 2,545,985

HIGH-FREQUENCY OSCILLATOR

Robert M. Baker, Baltimore, Md., assignor to Westinghouse Electric Corporation, East Pittsburgh, Pa., a corporation of Pennsylvania Application September 19, 1947, Serial No. 774,912

2 Claims. (Cl. 250—36)

1

For certain purposes, among them the heating of certain dielectric materials by frequencies of the order of 20 to 50 megacycles, it is desirable to provide a single-ended oscillation generator of the vacuum tube type embodying a tank circuit. In any such case, it is necessary to interpose a blocking capacitor in the path between the anode and cathode which passes through the inductance of the tank circuit in order to prevent virtual short-circuiting for direct current between those electrodes. At frequencies of the order of a few megacycles per second, such blocking capacitors interpose no practical difficulties, even though the blocking capacitor has to carry the charging current of the stray capacitance present between the anode and ground. However, as the frequency rises to higher values, the charging current of this stray capacitance becomes so great that a bulky and expensive blocking capacitor becomes necessary. At such frequencies, in fact, the stray capacitance above mentioned is so great that the provision of any other capacitance in the tank circuit becomes undesirable, and the tank circuit comes to consist simply of an inductance in series with a blocking capacitor connected between the anode and ground, together with the above-mentioned stray capacitance between the anode and ground.

One object of my invention is to avoid the necessity for employing a bulky and expensive blocking capacitor between the anode and the inductor of such a tank circuit as I have just described.

Another object of my invention is to provide an improved structural and circuit arrangement for oscillation generators operating at frequencies above a few megacycles per second.

Figure 2:
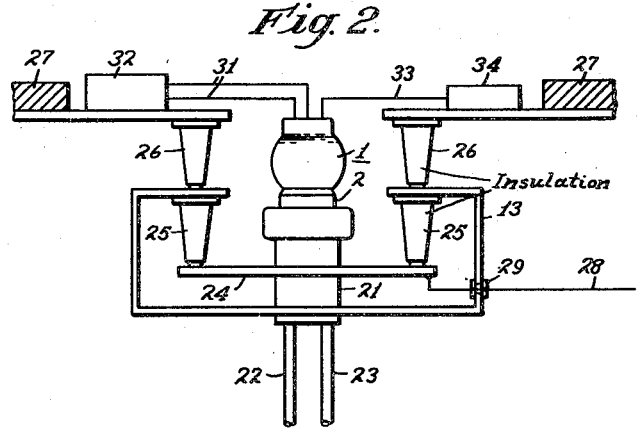

Other objects of my invention will become apparent upon reading the following description, taken in connection with the drawing, in which:

Figure 1 is a schematic diagram of a circuit carrying out the principles of my invention; and Fig. 2 is an illustrative view in elevation to show at least schematically the actual structural arrangement which may be employed.

Referring in detail to the drawing, an electrical discharge tube 1, provided with an anode 2, a control grid 3 and a cathode 4 of conventional type, has its cathode grounded and its anode connected through a choke coil 5 to the positive terminal 6 of a direct-current source of which the negative terminal is grounded. The control grid 3 is connected through an inductor 7 to a capacitor 8 which is shunted by a resistor 9. The terminals of the capacitor 8 and resistor 9, which

2 are remote from the inductor 7, are connected to ground. The anode 2 is connected through a blocking capacitor 11 to one end of a second inductor 12 having its other end grounded. A conducting housing or shield 13 is provided which sufficiently surrounds the anode 2 to cut off a large fraction of the lines of electric force between said anode and the ground. The shield 13 is connected to the common junction of the blocking capacitor 11 and the inductor 12, and has a large capacitance to ground which is represented schematically in Fig. 1 in dotted lines by the capacitor 14.

The circuit arrangement shown in Fig. 1 will, when tuned to frequencies of the order of 20 megacycles and above, operate as a tuned plate, untuned grid oscillator, the capacitance between the plate and grid acting sufficiently to couple the plate and grid circuits and produce self-oscillation of the tube. The inductor 12 and the stray capacitance 14 will act as the tank circuit of the oscillator. In this arrangement, the blocking capacitor 11, being interposed between the anode 2 and the shield 13, no longer has to carry the charging current between the anode and ground since the shield 13 is interposed in the path of the greater number of lines of electric force between the anode and ground and varies in potential relative to ground nearly in synchronism with the anode. The blocking capacitor 11 may, accordingly, be a comparatively cheap and compact construction.

While the shield 13 usually has a capacitance to ground greater than that which the anode would have in its absence, this is actually an advantage for many types of work, since it increases the kilovolt amperes circulating in the tank circuit and provides an oscillator capable of feeding power into loads of very low power factor.

To illustrate one convenient form of structure in which the circuit diagrammed in Fig. 1 may be incorporated, Fig. 2 shows the electrical discharge tube 1 as of the external anode type, this anode being provided with a water jacket 21 of conventional type supplied with cooling water through a pair of pipes of insulating material 22 and 23 in ways well known in the electrical discharge tube art. The water jacket 21 is supported and connected to a plate 24 which is supported on insulators 25 from the enclosing shield 13. The enclosing shield 13 is, in turn, supported on insulators 26 from a base 27 which is essentially at ground potential. The plate 24 is connected through a lead 28 passing through an insulator 29 in the shield 13 and running to the inductor 5 and positive voltage terminal 6, shown in Fig. 1. The cathode 4 is connected through leads 31 to a grounded source 32 of cathode-heating current, and the control grid 3 is connected through a lead 33 to the resistor 9, shown in Fig. 1, which may be enclosed in a container 34 supported on the platform 27.

I claim as my invention:

1. In a high frequency electronic generator, an electrical discharge tube having an anode, control electrode and grounded cathode, a control electrode circuit between said control electrode and said cathode, a direct-current voltage source connected to supply current between said anode and said cathode, a conducting shield interposed in the electric field between said anode and ground, an inductor connecting said shield to ground, and a blocking capacitor connecting said anode to said shield.

2. An oscillation generator comprising an electrical discharge tube having an anode, a control electrode and a grounded cathode, an inductor which is in series with a capacitor shunted by a resistor connected between said control electrode and said cathode, a source of direct current connected to cause current flow between said anode and said cathode, a conducting shield interposed in the path of lines of electric force between said anode and ground, an inductor connecting said shield to ground and a blocking capacitor connecting said shield to said anode.

ROBERT M. BAKER.

REFERENCES CITED

The following references are of record in the file of this patent:

UNITED STATES PATENTS

| Number | Name | Date |
| --- | --- | --- |
| 2,202,487 | Gossel et al. | May 28, 1940 |
| 2,429,085 | Albin | Oct. 14, 1947 |
| 2,453,489 | Bruntil et al. | Nov. 9, 1948 |